United States Patent Office 3,370,971
Patented Feb. 27, 1968

3,370,971
SILICA-COATED LEAD CHROMATE PIGMENT
Howard R. Linton, Scotch Plains, N.J., assignor to E. I. du Pont de Nemours and Company, Wilmington, Del., a corporation of Delaware
No Drawing. Continuation-in-part of application Ser. No. 493,259, Oct. 5, 1965. This application June 8, 1966, Ser. No. 555,954
2 Claims. (Cl. 106—298)

ABSTRACT OF THE DISCLOSURE

Lead chromate pigments which have greatly improved resistance to discoloration upon contact of such compositions with acids, alkalies, and soap solutions, and upon exposure to light and heat, and which consist essentially of lead chromate pigment particles having deposited on their surfaces, as a substantially continuous coating, about from 2% to 40% by weight of dense, amorphous silica, optionally also, such silica-coated lead chromate pigment particles with alumina deposited on the silica. Also, processes for effecting such deposition comprising (1) slurrying the lead chromate pigment particles in an aqueous medium and depositing amorphous silica on them from an aqueous sodium silicate solution at a pH above 6 and a temperature above 60° C., and (2) adding an aqueous solution of an aluminum-containing compound to the resulting suspension of silica-coated lead chromate particles with continued heating above 60° C., whereby alumina is deposited on the silica coating.

---

This application is a continuation-in-part of my prior copending application Serial No. 493,259, filed October 5, 1965, now abandoned.

Background of the invention

Lead chromate pigments have been known and widely used for many years, and are available in a broad range of shades. On the one hand there is the very green shade "Primrose Yellow" in rhombic crystal form. A relatively pure lead chromate in monoclinic crystals form is much redder and is commonly known as "Medium Yellow." Intermediate shades are available in solid solutions of lead chromate and lead sulfate usually in monoclinic form. At the other extreme is a series of solid solutions of lead chromate, lead sulfate and lead molybdate in tetragonal crystal form which are oranges or even yellowish reds commonly known as "Molybdate Oranges" or "Molybdate Reds."

These lead chromate pigments are relatively inexpensive to manufacture and have generally good tinctorial properties, but they have certain notable deficiencies. One of the outstanding deficiencies becomes apparent with modern-day technology in the coloring and molding of plastic articles from thermoplastic resins. To improve economies of their use and the performance of such resins, especially polyethylene and polystyrene resins, the art has increased the temperatures of extrusion up to as high as about 320° C. It is found that lead chromate pigments cannot be used in thermoplastic resins above about 210° C. without serious darkening which becomes much worse as the temperature increases. Many such pigments when heated above about 220° C. in contact with molten thermoplastic resins become chemically reduced and appear very brown and dull, losing all of their attractive appearance. Thus, there has been a serious need for a method of treating lead chromate pigments to enable their use in coloring thermoplastic resins which are to be extruded at a temperature of 220° C. or above.

Chemical staining, especially spotting from contact with soap and alkalies, and discoloration from atmospheric sulfide fumes, have deterred the use of lead chromate pigments in high grade automotive finishes and a need for such pigments resistance to these and other chemical agents has been apparent.

Description of the invention

Now according to the present invention it has been found that the foregoing and related deficiencies of lead chromate pigments can be corrected, and pigments having excellent stability against darkening and discoloration can be produced, by coating the lead chromate pigment particles with at least about 2% by weight, based on the total weight of coated product, of dense amorphous silica. Even better stability can be achieved by depositing alumina on the silica-coated pigment.

The improved silica-coated products of this invention are made by suspending the lead chromate in finely divided form in an alkaline aqueous medium and then introducing into this medium an aqueous solution of active silica as defined hereinafter, whereupon the silica deposits on the surface of the particles in the form of a continuous coating or film of dense amorphous silica. The presence of this coating or film imparts improved properties to the lead chromate pigments. The active silica can be separately prepared or can be formed in situ as illustrated in detail in the examples.

These methods are not to be confused with such prior processes as those of Hanahan U.S. Patent 2,296,638, wherein a gel-like silica is precipitated in a lead chromate slurry by adding a sodium silicate solution followed by acidification, to impart an effect known as "high-flat hiding." Hanahan emphasizes the porous, gel-like structure of the silica. In other prior processes, small amounts of silica have been added as treating agents, but usually under conditions where the silica could react with metal ions present (such as aluminum ions) to give the corresponding metal silicates; such silicates are present in the products as discrete particles and do not form films or coatings on the surface of the pigment particles, and the products consequently are not heat-stable.

In contrast to the above-discussed prior processes, the novel silica-coated pigments of the present invention are produced only if the silica is applied to the lead chromate pigment particles in such a manner as to form thereupon a substantially continuous coating or film or layer of dense, amorphous silica. Such methods for coating particles other than lead chromate pigments with silica are described in Iler U.S. Patent 2,885,366. Similarly, coating with aluminosilicates are described in Alexander U.S. Patent 2,913,419. It will be understood that in the present invention a portion of the silica can be present other than as a coating on the pigment particles provided there is sufficient silica on the lead chromate particles to coat them. Preferably the predominant portion of the silica is present as such coating. The alumina, if present, is deposited on the silica, either as such or as a combination of the alumina with a portion of the total silica in the coating.

As noted above, the term "lead chromate pigments" is intended to be inclusive of all pigments which include lead chromate as a major component. These range from relatively pure lead chromate in monoclinic form to solid solutions containing lead sulfate or lead molybdate or both as substantial components. Also included are the rhombic lead chromates stabilized in that crystal form in various ways such as by the addition of trivalent aluminum ions and pyrophosphate ions. Although basic lead chromate orange pigments have been largely supplanted in the trade by the molybdate oranges, they are to be included as pigments which may be treated as herein disclosed.

Among specific lead chromate pigments to which the invention is applicable are the following, all references being to "Colour Index," 2nd edition, 1956, published jointly by the Society of Dyers and Colourists, England, and the American Association of Textile Chemists and Colorists, United States:

Chrome Yellow CI-77600
Basic Lead Chromate CI-77601
Lead Sulfochromate CI-77603
Molybdate Orange or Red CI-77605.

The major contribution toward color of these pigments resides in the lead chromate present therein. Likewise, many of their shortcomings are also attributable to the properties inherent in the lead chromate component. Among these may be mentioned:

(1) Sensitivity to alkalies and acids, associated with the solubilizing of the chromate ion,
(2) Staining in the presence of sulfides, associated with the formation of black lead sulfide, and
(3) Darkening on exposure to light or to elevated temperatures, associated with the reduction of hexavalent chromium to the trivalent state.

Attempts in the past to overcome these deficiencies have usually involved special treatments of the pigments designed either to provide a means of neutralizing the attacking agent and rendering it temporarily ineffective or to provide a barrier against the ready access thereof to the sensitive pigment particle. The claimed improvements, although very frequently demonstrable, have usually been only of academic interest in that their effectiveness has been short lived and not of sufficient duration to render possible the use of these pigments in those applications where the inherent shortcomings are so serious as to preclude use of the pigment. Thus, for example, lead chromate pigments cannot generally be used for the coloration of linoleum, because there would be an obvious change in color of the pattern in any areas where the surface was exposed to alkaline detergents, soap, dilute acetic acid (vinegar) or other agents to which lead chromate is sensitive. Similarly, the use of these pigments as ingredients of paints or other coating compositions which might be expected to be exposed to hydrogen sulfide fumes would be precluded, because such exposure would result in undesirable staining and darkening. In short, the effectiveness of a treatment to overcome the inherent deficiencies recognized in lead chromate pigments must be judged by the extent to which the utility of such pigments has been increased, and in particular the degree to which there has been penetration into fields of application hitherto regarded as closed to these pigments.

The silica coating as applied to the pigments in this invention has been described as a dense, amorphous, continuous coating. These characteristics are demonstrated by X-ray diffraction and by electron micrography. Silica is known to be present by analysis as well as by the method of preparation, but X-ray diffraction studies fail to show any of the lines characteristic of the various forms of crystalline silica. This is taken as indicative of the amorphous character of the silica present.

Electron micrographs show no evidence of a particulate character in the coating and no evidence of breaks in the coating, so the coating is considered to be both continuous and dense. The question of denseness can also be related to the character of the prior art pigments coated with silica gels where the porous and voluminous nature of the coating is plainly apparent in similar electron micrographs and even under the optical microscope.

As still another important property, the pigments show a high degree of imperviousness to the influence of many external agents, which fact distinguishes the dense, continuous coating from the porous, gel-like coatings of the prior art. In the case of those chemical reagents which ultimately do attack the pigments, the attack is much delayed as compared to untreated pigments or products treated with porous, gel-like silica.

Three methods of applying the silica coating are illustrated in the examples and there are certain critical conditions which must be observed during the treatment by any of these three methods. To obtain the effective silica coatings of this invention, the pH of the slurry at the point of addition of the silica-forming ingredients to the mixture must be at least above pH 6.0 and preferably in the range of 9.0 to 9.5. Furthermore, the temperature at this same point must be at least above 60° C. and preferably above 75° C. In many cases it is preferred that the temperature be about 90° C. When the pH is allowed to go below about 6.0 or the temperature significantly below 60° C., there is a pronounced tendency for the silica to precipitate in an undesired porous, gel-like structure.

The permissible alkali to use for the pH adjustment depends upon the substrate pigment to be coated. Thus, for example, where the core material is molybdate orange (CI-77605), wherein the lead chromate is in the lattice of a mixed crystal, considerable latitude is possible. In such a case, even as strong an alkali as dilute NaOH can be used, as is shown in certain of the examples. On the other hand, in those cases where the substrate is chrome yellow (CI-77600), the use of as strong an alkali as NaOH would result in chemical attack on the lead chromate of the crystal with ensuing partial chemical destruction of the pigment and consequent deleterious effect on its color and other properties. In such a case, the use of a weaker alkali, such as sodium silicate or ammonium hydroxide, as shown in other examples, is necessary, to preclude undesirable attack on the pigment. Other relatively mild alkalies, such as $Na_4P_2O_7$, can also be used.

Within the limits of pH and temperature specified above, the silica can be added in various ways, as illustrated in the examples, all of which result in the deposition of at least the major part of the silica as the desired amorphous continuous film on the surface of the pigment particles in the slurry. In all of these methods it is assumed that the pigment particles are well dispersed in sufficient water to give a fluid, easily-stirrable starting slurry. Such a slurry can result directly from the preparation of the pigment followed by suitable washing, or it can be a reconstituted slurry made either by redispersing a washed filter cake or by dispersing a dry pigment in water. A convenient starting slurry can contain approximately 25% pigment, the balance being water, but this concentration is not critical. It is common for lead chromate pigments to be finished slightly on the acid side, and when such pigments are reconstituted to form the starting slurry an alkaline treatment is necessary to achieve the desired pH at the point of subsequent treatment. Such an alkaline treatment can employ any convenient alkali, such as ammonium hydroxide or sodium hydroxide, unless the use of a strong alkali such as sodium hydroxide is precluded by the sensitivity thereto of the lead chromate pigment to be coated. A still more convenient method is to add a small amount of a sodium silicate solution; this achieves the desired alkalinity and tends to improve the dispersion of the pigment particles in the slurry. In such a treatment, care should be exercised not to exceed a pH of about 11.0 lest the lead chromate be somewhat solubilized. In the examples, the sodium silicate solution used in such an addition as well as in the subsequent treatment steps is a commercial product widely available with a $SiO_2Na_2O$ ratio of about 3.25 and a $SiO_2$ content of 28.4%. Such a product is convenient but not essential, and other sodium silicate solutions can be used as available. It is desirable, however, that the sodium ion content ($Na^+$) be kept low, since a high sodium ion content tends to cause gelation of silicic acid.

In one method of providing the desired silicic acid solution, illustrated in Example 1 below, a dilute sodium silicate solution (about 3% SiO₂) is passed through a bed of cation exchange resin in the hydrogen form of sufficient capacity so that all of the sodium ion is removed to give a silicic acid effluent with a pH of 2.9–3.3. Such a solution is only moderately stable, but will keep for several hours without gelation if maintained at a low temperature (close to 0° C.). A suitable amount of such a silicic acid solution is then added slowly (3–5 hours) to the alkaline pigment slurry at 90–95° C. while maintaining the pH in the range of 9.0–9.5 by the periodic addition of increments of a dilute alkali such as NaOH solution. Obviously, the exact method of maintaining the pH in the desired range is not important, and it could be done by maintaining the presence of a suitable buffer. Such a method would be subject, however, to the limitations imposed by the presence of sodium ion or other metallic ions, and the simple periodic addition of a suitable alkali has many points in its favor.

In another method, illustrated in Example 2 below, equivalent amounts of a dilute sodium silicate solution (5.7% SiO₂) and a dilute sulfuric acid solution (3.18% H₂SO₄) are added simultaneously to the hot (±95° C.) alkaline pigment slurry over a substantial period of time (3–5 hours) while maintaining the pH in the range of 9.0–10.0 by periodic addition of small amounts of dilute alkali (NaOH solution for instance). This is the preferred method of operation, and the variations mentioned earlier may easily be applied thereto. Thus, the pH may be allowed to go below 9.0, perhaps as low as 6.0 or 7.0, without completely destroying the desired effect; nevertheless, the results are better in the higher range. The reaction time can be reduced to as little as one hour without serious detriment. Although the temperature of reaction may be as low as about 60° C., this causes some tendency toward the formation of free SiO₂ in gel form; hence it is highly desirable to keep the temperature above at least 75° C. The exact concentrations of the solutions used are not important except that they should be relatively dilute, and the amounts used should be essentially chemically equivalent.

Still a third method of treatment is illustrated in Example 3 below, wherein all of the sodium silicate solution is added to the pigment slurry previously made alkaline, as with NH₄OH. This gives a pH of about 11.0, near the maximum permissible and, after heating the mixture to about 75° C., a 5% sulfuric acid solution is added slowly (1 to 1.5 hours) to give a final pH of about 7.8 to 8.0. An additional heating period up to about 1 hour is desirable in this procedure. Again the concentrations used and time of addition are illustrative rather than critical.

In each of these methods, the product at the end of treatment tends to be highly dispersed and difficult to filter, with a considerable tendency for yield loss during the filtration and a tendency to result in hard products on drying. It is preferable, therefore, that a flocculation step be introduced. This can be done in several ways. Example 1 uses a solution of a cation-active organic compound such as a quaternary ammonium salt for this purpose. In several of the examples, the same end is served by a final acidification to a point clearly below pH 7.0. Similarly, one may use of a polyvalent metal salt, especially an aluminum salt, in aqueous solution. Such a step, although not necessary to the preparation of pigments of the desired characteristics, offers many advantages such as improved ease of filtration and washing, the elimination of yield losses during filtration, and improved texture of the resulting pigments.

These methods of forming the silica layer on the surface of the lead chromate pigment particles have one feature in common, viz. that the silica is added as "active silica." When sodium silicate is acidified, silicic acid is formed, probably initially as orthosilicic acid, Si(OH)₄. However, this product tends to polymerize by the reaction of two silanol groups

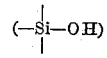

to form a siloxane group

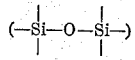

Under acidic conditions, this polymerization proceeds rapidly until a predominant proportion of the silanol groups present have been used up in the formation of siloxane bonds. The polymer thus formed has a high molecular weight and is defined as "inactive." Under the conditions of moderate alkalinity used in the examples below, there is a low degree of polymerization wherein the condensation between silanol groups has proceeded to only a limited extent leaving the silica in an "active" form which readily deposits on the surface of the lead chromate particles present. It is not intended to imply that there is no polymerization nor that the process of polymerization is completely inhibited but, under the conditions specified, the silica is in a state of low polymerization and, thus "active," for a sufficient time to bring about deposition in the dense, amorphous form on the surface of the lead chromate pigment particles. This term "active silica" has been more precisely defined elsewhere (see Rule U.S. Patent 2,577,484 for instance), but the conditions specified above are adequate for the purposes of this invention.

The products of this invention often exhibit somewhat higher surface areas than the original pigments from which they are made, some of which increase is ascribable to the fact that the lead chromate pigment particles have a much higher specific gravity than the silica in the coating. In the case of a typical Molybdate Orange pigment having, in the untreated state, a surface area of 9.7 m.²/gm., the surface areas of several treated products varied from 10.6 to about 34 m.²/gm. All these treated products, containing about 20% of SiO₂, were acceptable with respect to the desired improvement in resistance to influence of heat and other agents. To the extent that the increase in surface area encountered in practice is the consequence of the presence of a portion of the silica in the form of very fine, high-surface-area particles or gel, elimination of such free silica could result in improved products for a given content of silica.

The quantity of silica to be applied in the pigment treatment can be varied over a considerable range depending on the intended end use of the pigment. For use in extruded hot thermoplastic resins where relatively high temperatures (200–300° C.) are encountered, higher amounts, from 15 to 32% of silica, are desirable. There seems to be no great advantage in exceeding about 32%, but amounts up to about 40% of the final pigment can be used with some advantage in resistance to the heat treatment, but with some loss in color properties. Amounts less than 15% show a noticeable improvement over the untreated product but may lack the desired heat resistance. For other uses, however, such products with lower silica have real value, notably for resistance of coating compositions made therefrom to chemical treatment and to exposure to light. In such applications, as little as 2% of dense amorphous silica coatings on lead chromate pigments show real improvements over the untreated counterparts. Thus, for purposes of this invention, in its broadest aspects, the dense amorphous silica coating should be in the range of about 2% to 40% by weight of the final pigment. When alumina is also present, the quantity of Al₂O₃ can be varied from 0.25% to 2% by weight of the final pigment.

In a preferred embodiment of the invention, to make a silica-coated lead chromate pigment with alumina deposited thereon, a slurry of lead chromate pigment is heated in dilute aqueous solution of sodium silicate, whereupon a continuous silica coating is formed on the particles of pigment; thereafter, an aqueous solution of sodium aluminate is added and heating is continued. Alternatively, the initial deposition of the silica coating on the pigment particle may be effected by the addition of dilute sulfuric acid to the suspension of pigment in sodium silicate solution, and this step is then followed by the previously mentioned treatment with sodium aluminate solution. In either case isolation of the product involves filtration, washing, drying and pulverizing, all of which steps are conventional. It is understood, of course, that the steps of drying and grinding may be omitted and the product used as an aqueous paste or slurry in subsequent applications.

The silica-coated and silica-plus-alumina coated lead chromate pigment products of this invention are colored pigments which are useful in all of the common applications of such colored pigments. They are particularly outstanding in value when used as coloring agents in automotive enamels which must resist the influence of light and of various chemical agents. The vehicles for such enamels may be based on oleoresinous products such as alkyd resins or they may be solutions of non-drying resins such as acrylic resins or nitrocellulose. Another use of great importance is emphasized in the examples, viz. the coloring of thermoplastic resins which are extruded at relatively high temperatures and which cause untreated lead chromate pigments to discolor badly at the common temperatures of extrusion. These are uses in which outstanding and unexpected values are found, but they are not limiting as to the usefulness of the pigments.

One precaution should be observed in the use of these pigments, which arises out of the fact that the coating has an element of fragility in that it can be ruptured by some treatments so that the product no longer exhibits its resistance to the various agents abovementioned. For instance, if the new products are mixed with a hard, granular material, such as a crystalline salt or even a granular plastic such as polystyrene, and subjected to vigorous stirring as by tumbling or rolling in a closed container, the coatings appear to be essentially destroyed and the products have the general properties of an untreated pigment. Obviously, such handling should be avoided. Surprisingly, however, conventional mild pulverization of the dried lump pigment is not harmful, and the pigments can be mixed with very finely divided plastics without harm. Once they are wet with a vehicle or a molten plastic they can be handled in conventional means, as by ball-milling of an enamel or by dispersion in a molten plastic on a 2-roll mill or even in a Banbury mixer. With the above precautions, the products have general use as colored pigments.

This invention permits the preparation of lead chromate pigments having greater resistance to chemical attack than do lead chromate pigments of the prior art. This improvement is manifested in the decreased sensitivity of the novel products to alkali, acid and sulfides, as well as by their improved resistance to discoloration on exposure to light or to elevated temperatures. These improvements make possible the use of such treated lead chromate pigments in various applications, such as paints, printing inks, plastics, floor coverings, etc., where the previously recognized deficiencies of such pigments precluded such use.

These improved properties also serve to distinguish the novel products over the prior art. In U.S. Patent 2,913,419, Alexander states that the surface area of his aluminosilicate-coated product is lower than that of his starting substrate, whereas in the instant invention the reverse has invariably been found to be true. Coating a lead chromate pigment by Alexander's method has been found to yield a product which cannot be readily isolated by filtration; consequently, it is necessary to flocculate the resulting coated lead chromate pigment to permit filtration. The aforementioned flocculation is also desirable to reduce the cementing tendency of the coated particles to each other.

Lead chromate pigments coated by the method of Alexander have been isolated and dispersed in coating compositions and compared with their counterparts prepared by the method of the instant invention. Dispersing the pigment in the vehicle system necessitates work, usually of a shearing, grinding, and crushing nature, to insure the attainment of adequate dispersion. Tests of chemical resistance after such dispersion have shown that lead chromate pigments with coatings prepared by the method of Alexander actually lose a significant amount of their improved chemical resistance as a result of this dispersive action, whereas the products of the instant invention are much less susceptible to such deterioration. This appears to be explained by the fact that the cohesion between coated particles of products prepared by Alexander's method is so great that in the process of breaking down the aggregates to insure the desired degree of dispersion in the system, a significant portion of the coating is destroyed and enough uncoated surface of the original core is exposed to render it directly susceptible to chemical attack. In the case of the products of the instant invention, there does not appear to be such a cementing tendency between coated particles, and the coating of each individual particle is preserved intact during the process of dispersion in the vehicle system.

The following examples illustrate this invention in detail, but they are not intended to establish limits except as specified. Throughout the examples "parts" refer to parts by weight. In some cases, volumes are expressed in terms of equivalent parts by weight of water.

*Example 1*

Following the procedure of Example 1 of Bishop U.S. Patent 2,813,039 for making a Molybdate Orange pigment, 347 parts lead nitrate (1.05 mols $Pb(NO_3)_2$) is dissolved in water and diluted to a volume equal to 10,000 parts of water. In a separate container, 115 parts of sodium dichromate ($Na_2Cr_2O_7 \cdot 2H_2O$—0.77 mol $CrO_3$), 17 parts sodium sulfate (0.12 mol $Na_2SO_4$), 28 parts sodium molybdate (0.11 mol $Na_2MoO_4 \cdot 2H_2O$) and 32 parts caustic soda (0.8 mol NaOH) are dissolved in water and adjusted to a volume equal to 10,000 parts of water. With both solutions at about 20° C., the chromate solution is run into the thoroughly agitated lead nitrate solution.

After a brief stirring period, the pH is adjusted to about 2.5–3.0 by adding a dilute solution of nitric acid. On stirring for about 30 minutes, the color of the slurry changes from the initial bright yellow to the brilliant orange characteristic of Molybdate Orange pigments. A solution containing 23 parts of aluminum sulfate $$Al_2(SO_4)_3 \cdot 18H_2O$$

in 200 parts of water is then added and the pH adjusted to 6.0–7.0 with a dilute solution of caustic soda. After more stirring, the slurry is filtered and washed free of soluble salts. The resulting paste contains from 40% to 60% solids and may be dried at about 80° C. to give a typical Molybdate Orange pigment.

A portion of the paste prior to drying equivalent to 150 parts of dry pigment is slurried in water to make a total volume equivalent to 2,000 parts of water and stirred to give a uniform dispersion. To this is added 10 parts of water-white sodium silicate solution (28.4% $SiO_2$; $SiO_2/Na_2O$ ratio 3.28) to give a pH of 9.5–10.0 and the slurry heated to 95° C.

In a separate operation, 160 parts of the same sodium silicate solution is diluted to a total volume equivalent to that of 1500 parts of water and then passed through a bed of cation exchange resin in the hydrogen form ("Dowex 50") of sufficient capacity so that all of the sodium ion is removed to give a silicic acid effluent with a pH of 2.9–3.3. This 1500 parts of silicic acid effluent is then added to the Molybdate Orange slurry at 95° C. uniformly over a 5 hour period maintaining the pH throughout the addition period in the range of 9.0–9.5 by the addition of increments of dilute NaOH solution and also maintaining the temperature at 90–95° C. Stirring and treating are continued for 30 minutes after the addition of silicic acid is completed whereupon 1.0 part of a dialkyl dimethylammoniumchloride (alkyl-groups—16 to 18 carbon atoms) in 5% aqueous solution is added to flocculate the slurry which is then filtered, washed free of alkali and dried to give 190 parts of a Molybdate Orange pigment containing about 22% of silica present as a continuous film of dense amorphous silica surrounding the individual particles of the lead chromate derivatives.

When dispersed in a coating composition and coated on a panel which is exposed to light, the product containing silica is highly resistant to darkening whereas the untreated product darkens seriously under the same conditions.

When dispersed in molten thermoplastic resins, the untreated product darkens noticeably at 230° C. and becomes so highly discolored as to be useless at 260° C. In contrast, the silica treated product shows no significant discoloration up to about 250° C. and shows only minor discoloration up to 315° C. which is the maximum temperature commonly used in molding thermoplastic resins.

*Example 2*

This example describes the silica treatment of a Chrome Yellow pigment made according to the teaching of Example 1 of U.S. Patent 2,808,339 but without manganese treatment.

A solution of 165 parts lead nitrate ($Pb(NO_3)_2$) in 2000 parts of water at 20° C. is adjusted to a pH of 3.3 and added in about 10 minutes to a solution of 79.4 parts of sodium chromate ($Na_2CrO_4$) and 4.0 parts of sodium sulfate in 2000 parts of water at 20° C., adjusted to a pH of 7.7. After mixing these solutions, the pH should be in the range of 5.8–6.2. The suspension is then heated rapidly to about 93° C. and held at 93° C. for about 30 minutes. Then a solution of 16 parts aluminum sulfate ($Al_2(SO_4)_3 \cdot 18H_2O$) in 90 parts of water is added followed, after 2 minutes, with a solution of titanyl sulfate equivalent to 3.4 parts $TiO_2$ in 50 parts of water. After stirring a short time, the pH is adjusted to 6.0 by adding a solution of 28 parts sodium carbonate in 280 parts of water. The suspension is then filtered, and washed free of soluble salts. It may be dried to give a Chrome Yellow pigment of excellent properties or it may be retained in paste form for subsequent treatment as follows.

A portion of the paste containing 150 parts of the lead chromate derivative is dispersed in 1000 parts of water and 12.2 parts of sodium silicate solution (28.4% $SiO_2$; $SiO_2/Na_2O$ ratio 3.28) is added to bring the pH to 10.0 and the slurry is heated to 95° C.

In separate containers the following solutions are prepared:

(A) 125 parts of the same sodium silicate solution is diluted with water to a volume equivalent to 625 parts of water.
(B) 625 parts of 3.18% $H_2SO_4$ (20 parts $H_2SO_4$).

These solutions are then added simultaneously to the lead chromate pigment slurry uniformly over a five hour period, maintaining the temperature at 90–95° throughout and maintaining the pH in the range of 9.5–10 by periodic additions of small amounts of dilute NaOH solutions. The product is then filtered, washed free of alkali and dried to give a lead chromate pigment of superior properties.

When this product is dispersed in a coating composition vehicle and panels coated with the resulting composition are exposed to light, this product exhibits a markedly improved resistance to darkening when compared to similar panels made in like manner from the lead chromate pigment prior to treatment with silica.

It is likewise improved in resistance to acid. A drop of 10% sulfuric acid placed on the surface of a panel coated with the treated pigment shows substantially no change after one hour whereas the panel from the untreated pigment shows a marked change in color. In similar manner, panels made from the silica-treated lead chromate of this example are resistant to discoloration when spotted with 20% soap solution at 60° C., or with 1% NaOH for 1 hour in contrast to the untreated pigments which show marked changes in each case.

*Example 3*

Four hundred parts of a red shade Molybdate Orange pigment in dry powder form is dispersed in 1250 parts of water. The slurry is adjusted to pH 9.0 by adding conc. $NH_4OH$. Two hundred parts of water-white sodium silicate solution (28.4% $SiO_2$; $SiO_2/Na_2O$ ratio 3.28) is then added and the mixture agitated until a uniform dispersion results, the pH becoming about 11.1. The mixture is heated to 75° C. and 500 parts of 5% $H_2SO_4$ (25 parts $H_2SO_4$) is then added slowly over a period of 90 minutes to give a final pH of 7.8. Heating is continued for a further period of 1 hour after which sufficient 50% sulfuric acid is added to reduce the pH to 6.2. The slurry is filtered, washed free of soluble salts, and dried at 80° C. to give about 450 parts of red shade Molybdate Orange pigment containing about 11% silica present as a continuous film of dense amorphous silica on the surface of the pigment particles. This product has excellent heat stability (resistance to darkening) when dispersed in molten polyethylene at temperatures up to about 315° C., whereas the untreated product darkens badly at temperatures in excess of about 230° C.

*Example 4*

One hundred fifty parts of a red shade Molybdate Orange pigment in dry powder form is dispersed in 1250 parts of water. The slurry is adjusted to pH 10.0 by adding a solution of NaOH, and it is then heated to 90° C.

The following two solutions are separately prepared:

(A) 125 parts of water-white sodium silicate solution (28.4% $SiO_2$; $SiO_2/Na_2O$ ratio 3.28) is diluted with water to a volume equivalent to 625 parts of water.
(B) 625 parts of 2.85% $H_2SO_4$ in water.

Solutions A and B are added simultaneously to the hot pigment slurry at such a rate that it requires 4.5 hours for complete addition. Meanwhile the temperature is maintained at 90° C., and the pH is maintained at 9.0 by periodic additions of dilute NaOH solution. After the addition is complete, the pH is adjusted to 6.2–6.5 by adding dilute $H_2SO_4$ solution. After a 10 minute stirring period, the slurry is filtered, washed free of soluble salts and dried to give about 185 parts of a silica-coated Molybdate Orange pigment having about 19% $SiO_2$ as a continuous layer of dense amorphous silica on the pigment particles. This product is readily dispersed in hot polyethylene by preparing a 5% dispersion on a hot 2-roll mill (temperature about 150° C.). This is then reduced to 1% concentration in a laboratory "Van Dorn" injection molder by dilution with additional polyethylene using dwell times of approximately 20 minutes at the several temperatures. The resulting moldings are given numerical ratings as to appearance based on 10 as excellent (no color change) to 0-complete loss of color. The following table summarizes such a test at various temperatures.

| Pigment | 205° C. | 233° C. | 261° C. | 288° C. |
| --- | --- | --- | --- | --- |
| Silica coated product of this example | 10 | 8 | 8 | 7 |
| Control-untreated pigment | 10 | 5 | 2 | 0.5 |

The remarkable improvement attendant upon the presence of the continuous film of dense silica is obvious.

Example 5

Two hundred fifty parts of a light masstone, yellow shade Molybdate Orange pigment in dry powder form is dispersed in 1000 parts water and 10.5 parts water-white sodium silicate (28.4% $SiO_2$-ratio of $SiO_2/Na_2O$–3.28) is added to bring the pH to 9.5–10.0. The slurry is stirred until thoroughly dispersed and then heated to 95° C.

In separate containers, the following solutions are prepared:

(A) 70 parts of the same sodium silicate solution is diluted with water to give a volume equivalent to 350 parts of water (20 parts $SiO_2$).
(B) 350 parts of 3.18% $H_2SO_4$ (11.1 parts $H_2SO_4$).

Solutions A and B are then added simultaneously to the heated, agitated slurry of Molybdate Orange pigment at rates of 3 parts per minute (total time about 2 hours). During this addition of solutions A and B, the temperature is maintained at 90–95° C., and the pH is maintained at 9.0–9.5 by periodic additions of small amounts of dilute NaOH solution. Heating is continued for ½ hour after the solutions have been added and the slurry is filtered, washed free of soluble salts and dried to give 270 parts of a Molybdate Orange pigment containing about 7.5% silica, the major portion of which is in the form of a continuous film of dense amorphous silica surrounding the individual pigment particles.

When dispersed in lithographic varnish (see ASTM Test for Mass Color and Tinting Strength—D387–60) and masstone panels are exposed to light by a carbon arc for 72 hours, the treated product shows very little change whereas an untreated Molybdate Orange of the same type darkens considerably on the same exposure.

Example 6

This example describes the treatment of primrose yellow pigment according to the invention.

A solution of 165.5 parts of lead nitrate ($Pb(NO_3)_2$) in 1250 parts of water is adjusted to pH 4.1 at 26° C., after which a solution of 25 parts of sodium carbonate in 200 parts of water at 26° C. is added rapidly (½ to 1 minute) and the mixture stirred for 5 minutes.

In a separate container, 56 parts of sodium dichromate ($Na_2Cr_2O_7 \cdot 2H_2O$), 6.9 parts of $H_2SO_4$ (100%) 3.1 parts of sodium sulfate ($Na_2SO_4$) and 5 parts of aluminum sulfate ($Al_2(SO_4)_3 \cdot 18H_2O$) are dissolved in 1250 parts of water at 26° C. and the pH adjusted to 1.85. This solution is then added rapidly (1–2 minutes) to the slurry of lead carbonate and then stirred for 5 minutes (pH should be 4.4). Then one adds rapidly a solution of 0.85 parts sodium pyrophosphate ($Na_4P_2O_7$) in 20 parts of water, followed after 1 minute by a solution of 2.1 parts sodium carbonate in 25 parts of water and then after 1 minute by a solution of 14.8 parts of sodium silicate (28.4% $SiO_2$-ratio of $SiO_2/Na_2O$ 3.28). After stirring 5 minutes at 26° C. the pH should be about 6.5, whereupon a solution of 14.5 parts aluminum sulfate ($Al_2(SO_4)_3 \cdot 18H_2O$) in 50 parts water is added rapidly, followed, after 2 minutes stirring, by 3 parts sodium carbonate in 100 parts water and then, after 2 minutes, by 0.8 parts sodium pyrophosphate ($Na_4P_2O_7$) in 100 parts water to give a pH of 5.3. After stirring 5 minutes the slurry is filtered and washed free of soluble salts. The presscake may be dried to give an intense primrose yellow pigment of relatively poor lightfastness (yield 166 parts).

To make a treated pigment of this invention a portion of this presscake equivalent to 100 parts pigment is dispersed in 1000 parts of water to which ammonium hydroxide is added to bring the pH to 9.0, whereupon 70 parts of sodium silicate solution (28.4% $SiO_2$-ratio $SiO_2/Na_2O$—3.28) is added and the mixture stirred to give a uniform suspension. While stirring, the mixture is heated to 75° C. Then about 175 parts of a 5% aqueous solution of $H_2SO_4$ is added at the rate of 2 parts per minute (total time about 90 minutes). The final pH should not go below 8.0. The mixture is then stirred for 1 hour at 75° C. and finally brought to a pH of 6.2 with additional 5% $H_2SO_4$. It is then filtered, washed free of soluble salts and dried to give a lead chromate pigment containing about 16% $SiO_2$ as a dense amorphous film on the surface of the particles. This product exhibits markedly improved lightfastness over the untreated control and is quite resistant to darkening in polyethylene when extruded at 240° C. to 300° C.

Example 7

*Part 1.*—One hundred fifty parts of a previously prepared Medium Chrome Yellow pigment is dispersed in 1250 parts of water to which about 10.0 parts of water-white sodium silicate (28.4% $SiO_2$; $SiO_2/Na_2O$ ratio= 3.28) is added to bring the pH to 9.5–10.0. The slurry is stirred until thoroughly dispersed, and heated to 90° C.

In separate containers, the following solutions are prepared:

(A) 125 parts of the same sodium silicate solution is diluted with water to give a volume equivalent to 625 parts of water (35.5 parts $SiO_2$).
(B) 625 parts of 3.18% $H_2SO_4$ (19.9 parts $H_2SO_4$).

Solutions A and B are then added simultaneously to the heated agitated slurry of Medium Chrome Yellow pigment at rates of 3 parts per minute (total time about 3½ hours). During the addition of silicate and acid, the pH is maintained at 9.5–10.0 by the periodic addition of small quantities of dilute NaOH solution. Heating is continued for ½ hour after the addition is complete and the slurry is filtered, washed free of soluble salts and dried to give 188 parts of a Medium Yellow pigment containing about 20% silica substantially all of which is in the form of a dense amorphous coating on the pigment particles.

*Part 2.*—The above procedure is repeated in all details except that the amount of Chrome Yellow pigment used is 75 parts instead of 150 parts and the final yield is 111 parts of a Chrome Yellow pigment containing about 32% silica, mostly in the form of a dense, amorphous coating on the pigment particles.

When tested in hot polyethylene extrusions at 288° C. according to the method described in Example 4, the original untreated Medium Yellow pigment has a rating of 0, the 20% treated product of Part 1 has a rating of 7, and the 32% treated product of Part 2 rates 9.5–10.

The progressive improvement as the amount of silica is increased is apparent in this example.

Example 8

This example illustrates the preparation of a silica-coated pigment of the invention having alumina deposited thereon.

A uniform slurry of 50 parts of chrome yellow (CI–77600) in 384 parts of water is rendered slightly alkaline (pH 8.0±0.2) by the addition of dilute NaOH solution. To this is added 4.4 parts of sodium silicate solution (28.4% $SiO_2$, $Na_2O/SiO_2$ ratio=1/3.25), equivalent to 1.25 parts of $SiO_2$. The pH of the slurry is thereby raised to 10.3±0.2. The mixture is then heated with agitation to 90° C. and held at this temperature for ½ hour, whereupon the pH drops to 8.5±0.2. An additional 4.4 parts of sodium silicate solution (equivalent to 1.25 parts of $SiO_2$) is then added, whereby the pH of the system is raised to 10.9±0.2. A solution of 2 parts of hydrated aluminum sulfate (containing 17.0% $Al_2O_3$ by analysis) in 66.6 parts of water is then introduced gradually and uniformly over a period of 4 hours with stirring. The slurry is maintained at 90° C. for ½ hour following this addition, at the end of which time the pH of the system is 5.1±0.2. An additional 3.1 parts of hydrated aluminum sulfate dissolved in 24 parts of water is then added, lowering the pH of the system to 3.2±0.2. The pH is then adjusted to 6.3±0.2 by the addition of dilute sodium hydroxide. The product is isolated by filtration and is washed free of soluble sulfate ion. It is dried at 60° C.

The specific surface of the initial untreated chrome yellow, determined by the well-known BET nitrogen gas absorption method, in one instance following the above-described procedure was 10 m.²/g.; after the coating was applied, the specific surface was increased to 13 m.²/g.

The advantages of the coated chrome yellow prepared by the method of Example 8, as compared with the untreated initial material and the silica-coated counterpart without alumina can be demonstrated by (1) immersing 1 g. samples of each in aqueous dilute sodium hydroxide solutions and observing the color change in the solid pigment, and (2) by measuring the chromate ion concentration in the solution. By both methods of assessment it was noted that the coated product prepared in accordance with the method of Example 8 showed the greatest alkali resistance of the three samples tested, although the silica-coated control without alumina was markedly superior to the untreated initial pigment.

When these three pigments were dispersed in various paint vehicles, and panels prepared therefrom were subjected to various chemical resistance tests, a similar order was observed with the coated product prepared in accordance wtih Example 8 being the best of the three. Among the paint vehicles used in such tests were:

(1) A medium length soya type alkyd.
(2) A 70/30 alkyd/melamine resin.
(3) A thermosetting acrylic.

Following the preperation of paint panels from the coating compositions the resulting dry films were subjected to spot tests with the following solutions:

1. For resistance to sulfide staining: 10% solution of $(NH_4)_2S$ for one hour,
2. Detergent resistance: 20% soap solution for four hours at 60° C., and
3. Acid resistance: 1% HCl evaporated to dryness on the panel.

The normal resistance of lead chromate per se to the above agents is very poor, and the demonstrable improvement characteristic of the product of Examples 8 by theese tests is readily apparent.

When these pigments are dispersed in plastics (e.g., polystyrene, polyethylene, polypropylene, etc.) and the resulting colored plastic compositions are exposed to baking temperatures (200–320° C.) normally encountered in their processing, those containing the coated pigments of the instant invention show excellent color stability. On the other hand, the control compositions pigmented with the corresponding uncoated counterparts darken markedly in proportion to the temperature and duration of exposure.

*Example 9*

The procedure of Example 8 is repeated, except that in lieu of the chrome yellow used therein an equivalent weight of Molybdate Orange (CI–77605) is substituted. The specific surface of the untreated pigment in this case was found to be 12 m.²/g. by the BET nitrogen gas adsorption method and that of the treated product was increased to 14 m.²/g. The advantages in chemical resistance over the untreated material and the silica-treated counterpart, as demonstrated by the methods discussed above, were similarly apparent.

*Example 10*

The procedure of Example 8 is repeated, except that an equivalent quantity of lead sulfochromate (CI–77603) is substituted for the pigment used therein. Similar advantages in chemical resistance over the untreated material and the silica-treated counterpart were found.

*Example 11*

A slurry of 150 parts of Molybdate Orange (CI–77605) is stirred to uniformity in 1250 parts of water, and the pH is adjusted to 9.5–10.0 with dilute NaOH solution. The temperature is raised to 95° C. and maintained at this point with stirring, whereupon the following two solutions are introduced simultaneously at a uniform rate of approximately 3 parts per minute:

(1) 27.8 parts of sodium silicate solution (28.4% $SiO_2$, $Na_2O/SiO_2$ ratio=1/3.25), equivalent to 7.9 parts of $SiO_2$, diluted to 140 parts with water, and
(2) 140 parts of an aqueous 2.85% $H_2SO_4$ solution.

During this addition the pH of the slurry is maintained at 9.5–10.0 by adding small amounts of dilute NaOH solution as required and the temperature is held at 95° C. throughout. Stirring is continued for 30 minutes, following which a solution of 8.84 parts of sodium aluminate (equivalent to 2.2 parts of $Al_2O_3$) is added dropwise. Stirring is continued for ½ hour at 95° C., and the pH is then adjusted to 6.0–6.5 with dilute sulfuric acid. A solution of 4.67 parts of hydrated aluminum sulfate (containing 17.0% $Al_2O_3$ by analysis) in 100 parts of water is then added. The pH of the slurry is readjusted to 6.0–6.5 with dilute NaOH solution. The product is isolated by filtration, washing free of soluble sulfate ion and finally drying at 80° C.

*Example 12*

The pH of a uniform slurry of 150 parts of Molybdate Orange (CI–77605) in 1250 parts of water is carefully adjusted to 8.0±0.2 with ammonium hydroxide solution. To this is added 27.8 parts of sodium silicate solution (containing 28.4% $SiO_2$ by analysis, $Na_2O/SiO_2$ ratio=1/3.25), equivalent to 7.9 parts of $SiO_2$. The pH of the slurry is thus raised to 11.0±0.2. The mixture is stirred and heated to 95° C. and 150 parts of a 2% aqueous solution of $H_2SO_4$ is added over a period of one hour. Following 30 minutes of additional stirring, an aqueous solution of 8.84 parts of sodium aluminate (equivalent to 2.2 parts of $Al_2O_3$) is added dropwise, and heating is continued for ½ hour. At this point an additional 150 parts of a 2% aqueous solution of $H_2SO_4$ is added over one hour, following which the pH is adjusted to 6.0–6.5 with 50% $H_2SO_4$. Then 4.67 parts of hydrated aluminum sulfate (17.0% $Al_2O_3$ by analysis) dissolved in 100 parts of water is added. The pH is adjusted to 6.0–6.5 with dilute NaOH solution. The product is isolated in the conventional manner.

What is claimed is:

1. A lead chromate pigment resistant to discoloration upon contact with light, dilute acids, dilute alkalies, soap solutions and especially with molten thermoplastic resins in the temperature range of 220° C. to 320° C., said pigment consisting essentially of lead chromate pigment particles having deposited on the surface thereof about from 2% to 40% by weight, based on the total product weight, of dense, amorphous silica, at least a portion of said silica being deposited around the individual lead chromate particles as a substantially continuous coating, and from about 0.25% to about 2 % by weight of alumina, based upon the total weight of the composition, deposited on the silica coating.

2. In a process for producing a silica-coated lead chromate pigment having improved resistance to (a) darkening when dispersed in thermoplastic resins at high temperatures and (b) discoloration upon contact with acids, alkalies, and soap solutions, the steps comprising (1) slurrying the lead chromate pigment particles in an aqueous medium and deposition about from 2% to 40% of amorphous silica on them from an aqueous sodium silicate solution at a pH above 6 and a temperature above 60° C., (2) adding an aqueous solution of an aluminum-containing compound to the resulting suspension of silica-coated lead chromate particles in an amount equivalent to from 0.25 to 2% by weight of $Al_2O_3$ based on the final pigment weight, and (3) continuing heating above 60° C., whereby alumina is deposited on the silica coating.

References Cited

UNITED STATES PATENTS

| | | | |
|---|---|---|---|
| 2,296,638 | 9/1942 | Hanahan | 106—298 |
| 2,885,366 | 5/1959 | Iler | 106—308 |

TOBIAS E. LEVOW, *Primary Examiner.*

JAMES E. POER, *Examiner.*